US008769479B2

(12) United States Patent  
Clark et al.

(10) Patent No.: US 8,769,479 B2
(45) Date of Patent: Jul. 1, 2014

(54) PHYSICAL ON DEMAND (75) Inventors: Melvin E. Clark, Minnentonka, MN (US); Richard M. Bump, Savage, MN (US); Peter Jirak, Minneapolis, MN (US)

(73) Assignee: Digital River, Inc., Minnetonka, MN (US)

( * ) Notice: Subject to any disclaimer, the term of this patent is extended or adjusted under 35 U.S.C. 154(b) by 1599 days.

(21) Appl. No.: 11/669,935

(22) Filed: Jan. 31, 2007
(Under 37 CFR 1.47)

(65) Prior Publication Data
US 2007/0234353 A1 Oct. 4, 2007

Related U.S. Application Data (60) Provisional application No. 60/764,200, filed on Jan. 31, 2006.

(51) Int. Cl.
*G06F 9/44* (2006.01)
*G06Q 30/00* (2012.01)
*G06Q 30/06* (2012.01)

(52) U.S. Cl.
CPC .................................. *G06Q 30/06* (2013.01)
USPC .............. 717/101; 717/100; 705/26; 705/27

(58) Field of Classification Search
CPC .............. G06Q 10/06; G06Q 10/0631; G06Q 10/06313; G06Q 10/06311; G06Q 10/103; G06Q 10/063; G06Q 10/063118; G06Q 10/06312; G06Q 10/1097; G06Q 10/06315; G06Q 10/101; G06Q 30/0633; G06Q 30/00; G06F 8/38; G06F 9/542; G06F 17/3089
See application file for complete search history.

(56) References Cited

U.S. PATENT DOCUMENTS

| | | | |
|---|---|---|---|
| 5,418,654 A | 5/1995 | Scheffler | |
| 5,418,713 A | 5/1995 | Allen | |
| 5,635,815 A | 6/1997 | Whitchurch et al. | |
| 5,794,217 A | 8/1998 | Allen | |
| 5,812,849 A * | 9/1998 | Nykiel et al. | 717/101 |
| 5,878,141 A | 3/1999 | Daly et al. | |
| 5,900,830 A | 5/1999 | Scheffler | |
| 5,918,213 A | 6/1999 | Bernard et al. | |
| 5,930,768 A * | 7/1999 | Hooban | 705/26.81 |
| 5,960,412 A | 9/1999 | Tackbary et al. | |
| 6,550,052 B1 * | 4/2003 | Cramer et al. | 717/100 |
| 7,222,330 B2 * | 5/2007 | Bicknell et al. | 717/101 |
| 7,272,815 B1 * | 9/2007 | Eldridge et al. | 717/101 |
| 7,487,129 B2 * | 2/2009 | Doll-Steinberg | 705/58 |

(Continued)

OTHER PUBLICATIONS

Jim Pinto; Manufacturing strategies in the global environment; Nov. 2007; Automation.com; retrieved online on Apr. 30, 2014; pp. 1-6; Retrieved from the Internet: <URL: http://www.jimpinto.com/writings/mfgstrategies.html>.*

(Continued)

*Primary Examiner* — Thuy Dao
*Assistant Examiner* — Hanh T Bui
(74) *Attorney, Agent, or Firm* — Billion & Armitage; Richard E. Billion (57) ABSTRACT

A software system that performs the creation of compact discs (CDs) containing full product files (executables, binaries, etc.) is described. This system allows clients to produce, on demand, software CD's as required for purchases and avoid maintenance of stock of product. A method of providing software CD's also is described.

12 Claims, 6 Drawing Sheets

(56) References Cited

U.S. PATENT DOCUMENTS

| | | | |
|---|---|---|---|
| 7,487,162 B2* | 2/2009 | Kitamura et al. | 1/1 |
| 7,890,927 B2* | 2/2011 | Eldridge et al. | 717/100 |
| 7,984,420 B2* | 7/2011 | Eldridge et al. | 717/100 |
| 8,060,222 B2* | 11/2011 | Eldridge et al. | 717/100 |
| 8,225,271 B2* | 7/2012 | Eldridge et al. | 717/101 |
| 8,423,427 B2* | 4/2013 | Mikkelsen et al. | 705/26.8 |
| 2002/0072986 A1* | 6/2002 | Aram | 705/26 |
| 2002/0128927 A1* | 9/2002 | Rosenbaum | 705/26 |
| 2003/0036974 A1* | 2/2003 | Allen | 705/27 |
| 2003/0069811 A1 | 4/2003 | Ximenes et al. | |
| 2003/0110293 A1 | 6/2003 | Friedman et al. | |
| 2003/0167259 A1 | 9/2003 | Casson et al. | |
| 2003/0197394 A1 | 10/2003 | Dimmer | |
| 2003/0233264 A1* | 12/2003 | Jones et al. | 705/8 |
| 2004/0068443 A1* | 4/2004 | Hopson et al. | 705/26 |
| 2004/0078293 A1 | 4/2004 | Iverson et al. | |
| 2004/0205016 A1* | 10/2004 | Lin et al. | 705/37 |
| 2005/0177452 A1* | 8/2005 | Colwell | 705/26 |
| 2006/0106734 A1* | 5/2006 | Hoffman et al. | 705/64 |
| 2007/0005443 A1* | 1/2007 | Toshikage et al. | 705/26 |
| 2007/0050267 A1* | 3/2007 | Toshikage et al. | 705/26 |
| 2008/0162305 A1* | 7/2008 | Rousso et al. | 705/27 |

OTHER PUBLICATIONS

Carl P. Terpack; Computer Integrated Manufacturing—An Enterprise View; May 1990; IEEE; retrieved online on Apr. 30, 2014; pp. 662-669; Retrieved from the Internet: <URL: http://ieeexplore.ieee.org/stamp/stamp.jsp?tp=&arnumber=122260>.*

Susan E. Yager; Everything's Coming Up Virtual; Oct. 1997; retrieved online on Apr. 30, 2014; pp. 1-10; Retrieved from the Internet: <URL: http://delivery.acm.org/10.1145/280000/270994/p6-yager.pdf?>.*

* cited by examiner

PHYSICAL ON DEMAND

RELATED APPLICATIONS

This application claims the benefit of U.S. Provisional Application No. 60/764,200 filed 31 Jan. 2006, entitled "Physical On Demand," which is incorporated herein by reference.

FIELD OF THE INVENTION

The present invention relates to remote manufacturing of software media over a network. More particularly, the present invention relates to a system and related method for creating and managing production of physical copies of software.

BACKGROUND OF THE INVENTION

Historically, to make physical software, one would have to make many copies of the product which may or may not sell before the product is obsolete. A need exists for a system that allows you to sell physical copies of your software created to order. No extra inventory is left on hand and there is no need to dispose of obsolete products. The issue from an administrative point of view, is that all of the compact disc (CD) or digital video disc (DVD) contents and graphics have to be uploaded and maintained. Software publishers generally want to produce on demand software CDs or DVDs as required for purchases to avoid maintenance of the stock of product.

The present invention provides a solution to these needs and other problems, and offers other advantages over the prior art.

BRIEF SUMMARY OF THE INVENTION

The present invention is related to a software system that solves the above-mentioned problems. In accordance with one embodiment of the invention, creation of compact discs (CDs) containing full product files (executables, binaries, etc.) are described. This will allow clients to produce, on demand, software CD's as required for purchases and avoid maintenance of stock of product. Additionally, with physical on demand fulfillment, there will be no concerns surrounding backorder or cancellation of orders.

Additional advantages and features of the invention will be set forth in part in the description which follows, and in part, will become apparent to those skilled in the art upon examination of the following or may be learned by practice of the invention.

BRIEF DESCRIPTION OF THE DRAWINGS

FIGS. 5 and 6 are sample user interface pages for product selection.

FIG. 7 is a sample user interface page for upload of a CD/product case image.

DETAILED DESCRIPTION

Figure 1:
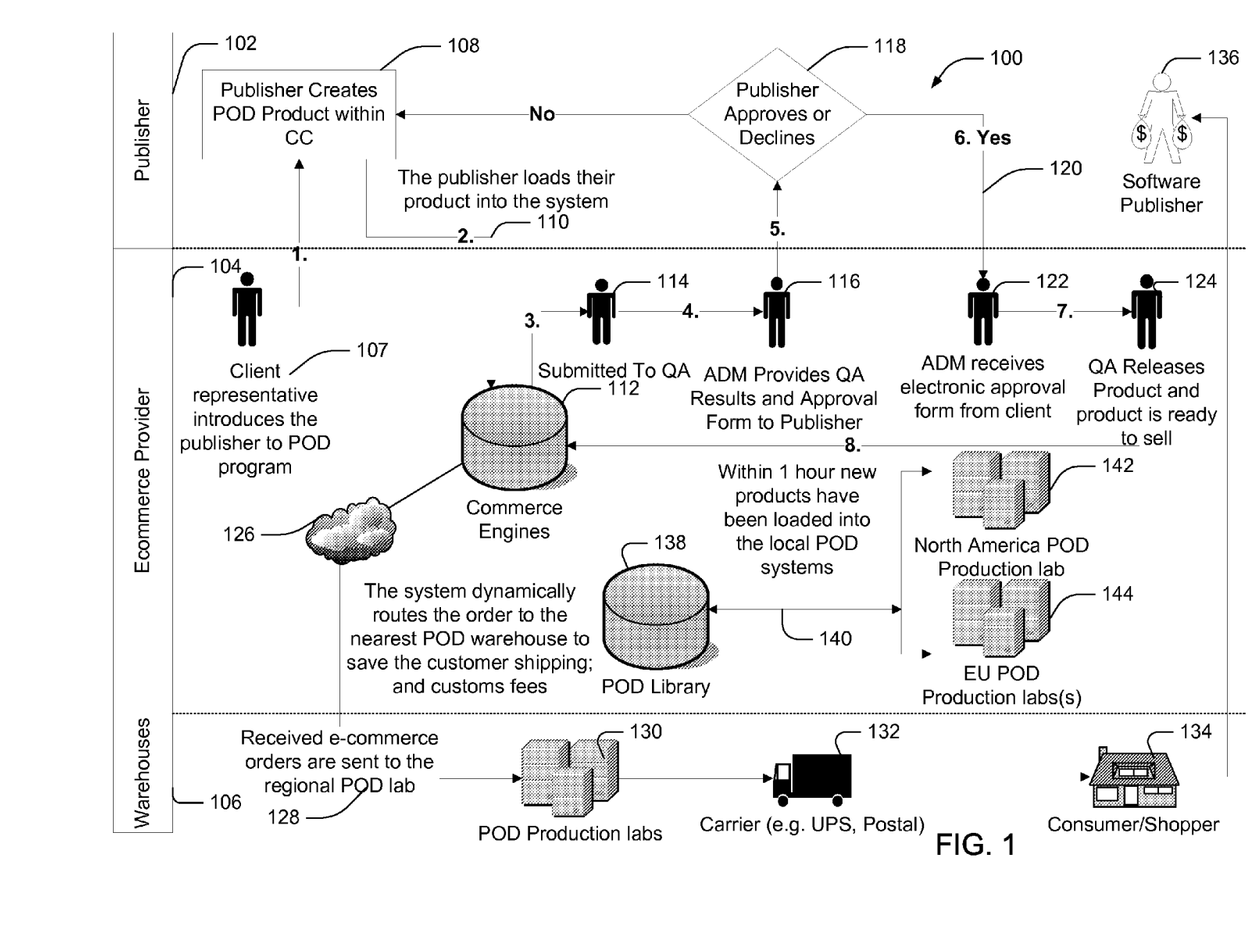
FIG. 1 shows a diagram of a physical on demand system.

FIG. 1 shows a preferred embodiment of the present invention physical on demand (POD) system 100. It will be appreciated by those skilled in the art that although the following describes creation of software CDs, the present invention may also be practiced with the creation of software, music, or video CDs or DVDs without departing from the scope and spirit of the present invention. There are three main actors in this system 100, including a publisher 102, an e-commerce provider 104, and warehouses 106.

Initially, a client representative of the e-commerce provider 104 introduces 107 the publisher 102 to the POD system 100. Subsequently, the publisher 102 creates 108 a POD product within a commerce system. After creating the POD product, the publisher 102 loads 110 their product source data into the commerce engine 112. Next, the POD product description and source data are submitted 114 to a quality assurance (QA) team at the e-commerce provider 104. Once QA is done, an account development manager (ADM) provides 116 quality assurance results and an approval form to the publisher 102. At this point the publisher 102 approves or declines 118 publication of their product in the POD system. If the publisher declines, the process returns to the initial state 108 in the publisher's control. After publisher 102 approval 120, the ADM receives 122 electronic approval back from the publisher/client 102. Thereafter, QA releases 124 the product and the product is ready to sell.

Whenever commerce engine 112 receives new approved products, it updates a POD library 138. Within approximately one hour, new product information is loaded 140 into local POD systems in various parts of the world. These local POD systems may be located in a North American production lab 142, a European production lab 144, or other locations like Japan, Australia or India.

When orders for the product are received 126 by the e-commerce provider 104 for the product, the system dynamically routes the order to the nearest POD warehouse 106. The nearest POD warehouse 106 is calculated to be the one that saves the customer the most shipping and customs fees. Received E-commerce orders are sent 128 to the regional POD production lab 130 where a software CD is produced and shipped via a carrier 132 (e.g. UPS, postal service) to the end consumer/shopper 134. At this point, a software publisher 102 is paid 136. Note, a publisher 102 is only charged a processing fee by an E-commerce provider 104 for actual orders, there are no extra fees or hidden costs.

Figure 2:
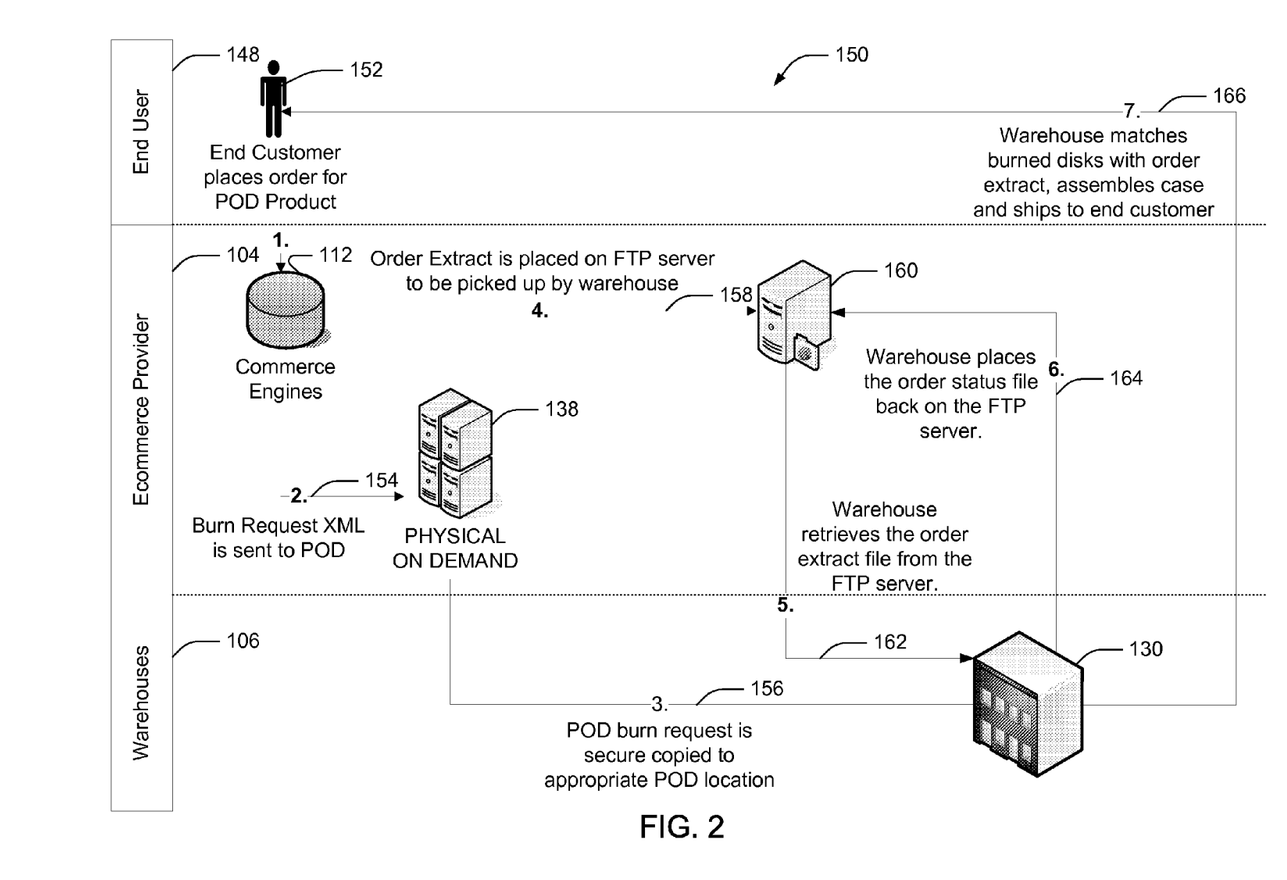
FIG. 2 shows an order process flow in the physical on demand system.

FIG. 2 shows a typical order process flow 150 according to a preferred embodiment of the present invention. An end customer/user 148 places 152 an order for a POD product which is received by an E-commerce provider 104 commerce engine 112. The commerce engine 112 sends 154 a burn request XML message to the POD library/system 138. The POD library/system 138 sends 156 the POD burn request via a secured copy mechanism to the appropriate POD production lab 130. In parallel, the commerce engine 112 places 158 an order extract on an FTP server 160. The warehouse 106 retrieves 162 the order extract file from the FTP server 160 and merges that with the POD burn request 156. Once the POD production lab 130 completes the CD burn, it notifies 164 the FTP server that the order status has changed by placing a file back on the FTP server. Additionally, the warehouse 106 matches 166 the burned CD with order extract file, assembles the CD into a case and ships it to the end customer/user 148.

Figure 3:
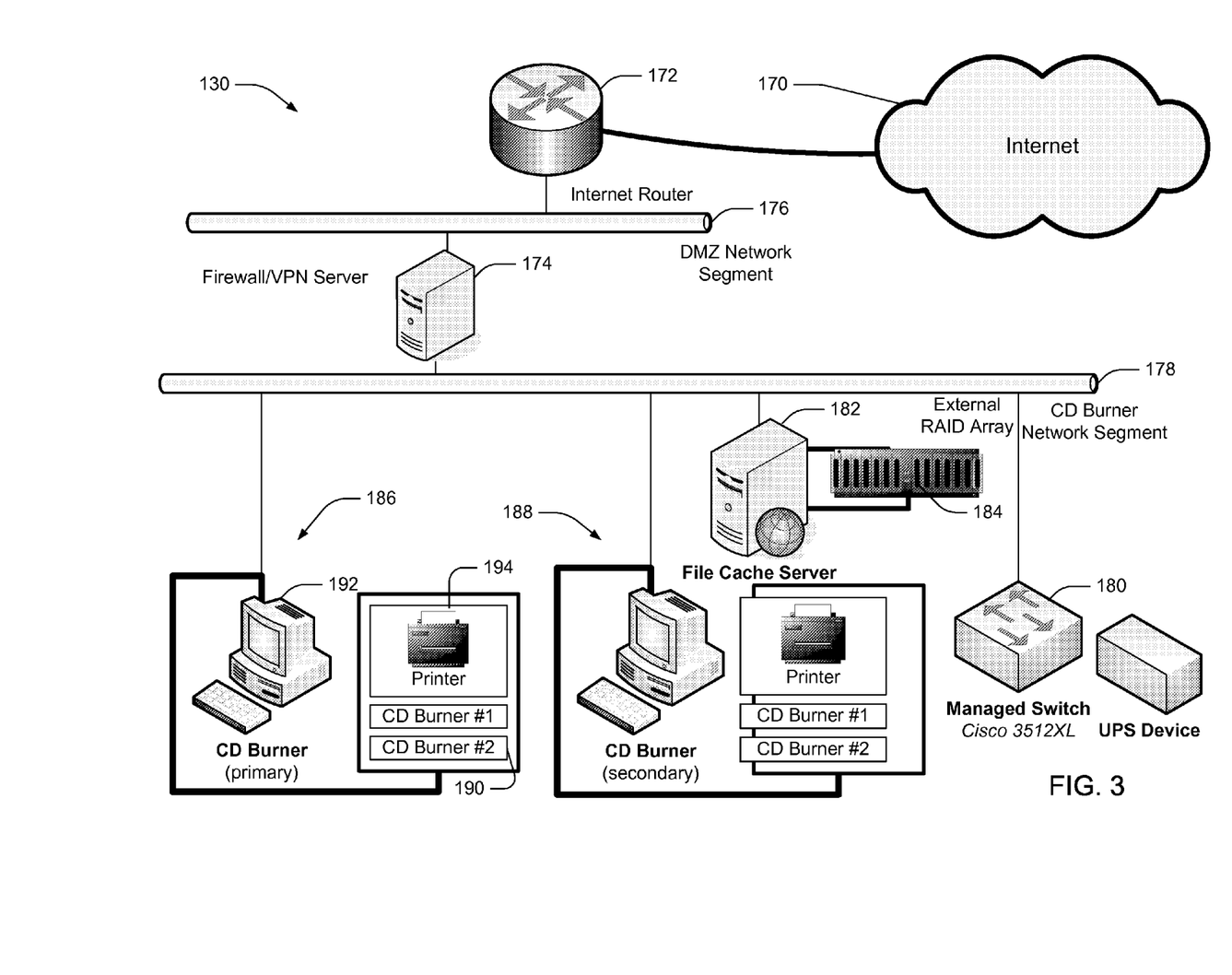
FIG. 3 shows a configuration for a POD production lab.

FIG. 3 shows a configuration for a POD production lab 130. The production lab 130 is connected to the internet 170 through an internet router 172. The router 172 is coupled to a firewall/VPN server 174 on a DMZ network segment 176. The firewall/VPN server 174 is also connected to a CD burner network segment 178 and protects the production lab 130 from hackers and other bad elements on the internet 170. Depending on the particular request received from the internet 170, the request is routed by a managed switch 180 to a file cache server 182 that has an external RAID storage array 184 or a CD burner module 186, 188. Each CD burner module 186, 188 consists of a CD burner 190, computer 192, and a printer 194.

Figure 4:
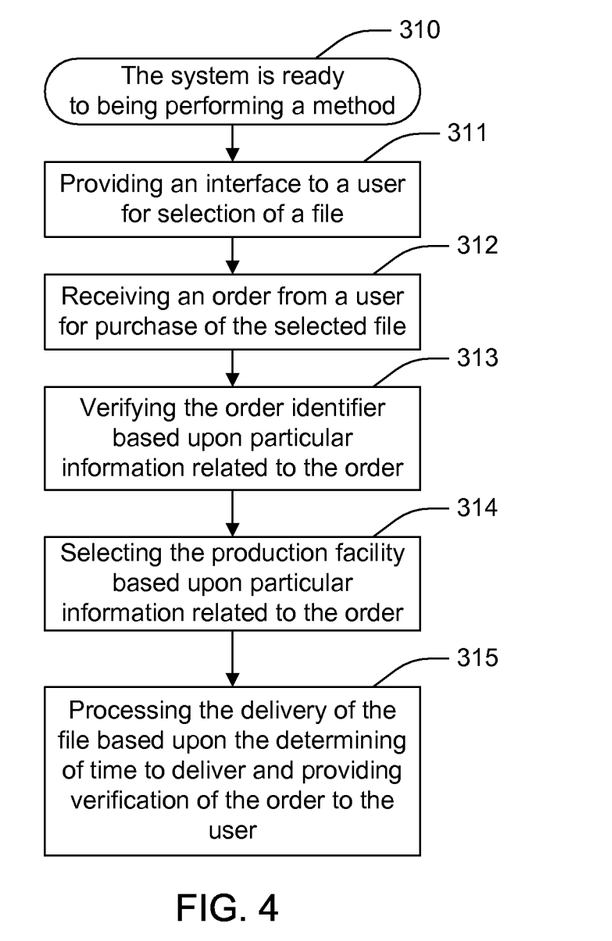
FIG. 4 shows a flowchart of process for using the POD system.

FIG. 4 shows a flow chart of a preferred embodiment process 310 for using a POD system 100 to remote manufacture software media from a network. The process begins by providing 311 an interface to a user for selection of a file. An order is received 312 from a user for purchase of the selected file. The order includes a file identifier related to the file and an order identifier related to the order. The order identifier is verified 313 based upon particular information related to the order. Verification may be done by verifying one or more of the following: a file identifier; a version identifier related to the file; a uniform resource locator for the file; or a customer identifier associated with the user. The production facility is selected 314 based upon particular information related to the order, including: (i) determining the production facility geographically close to the delivery location identified by the user; (ii) determining the time to manufacture based upon current production schedule; and (iii) determining the time to deliver to the location identified by the user based upon identified shipping constraints. The delivery of the file is processed 315 based upon the determining of time to deliver and providing verification of the order to the user.

This POD system 100 can be implemented in phases to:
   Allow fulfillment of software CDs created on demand; and
   Implement Physical on Demand process logic to systematically determine predefined CD burning facilities closet to shopper's location.
Assumptions for this system are that:
   Fixed pricing for all physical on demand products. No special pricing will be supported. (i.e. Tiered pricing, revenue share, discounts);
   The extract will burn the version of the product, which is active at the time the order was received;
   The production system can be integrated with other systems so that functionality developed within one system should replicate/integrate with other systems;
   Each location will be treated separately to support their own internal SKU numbers;
   CDs will use a standard linear file submission to manage the creation process;
   Process logic should determine nearest shipping location. If unable to determine optimal shipping location, then net fulfillment will be used as the default shipping locale to the shopper; and
   The overall system will support more than 1 location per country with an unlimited number of CD creation machines per location.
The following items may be added later to enhance the overall process or system:
   Pre-order functionality may be added;
   Multiple products on a single CD could be added; and
   Physical on demand products cancellation process could be added.

The system will be set up using a catalog manager so that a product can be selected as on demand fulfillment. This will indicate that the product upon purchase will be fulfilled through the creation of the product CD's at a predefined CD Burning Facility. At a site level, a CD fulfillment (whether on demand or to go) location will systematically be determined and established. Process logic should determine nearest shipping location. If unable to determine nearest location, net fulfillment will be used as the default shipping locale. QA is the only group that can release a new or revise physical on demand product or version. Only after the release is signed will QA activate CD.

One system preferably will handle all North American physical on demand orders. Net fulfillment will handle Europe (and service as the default facility). The United Kingdom will handle all other countries. When client need arises, UPS shipping can handle the Asia-Pacific region.

For products that are fulfilled through physical on demand, a publisher will have the ability to maintain the following information:
   Case Label information; includes image, spine text and text colour, front case text areas and associated colours (areas yet to be defined)
   CD Information; includes background image and text colour
   Files; upload and associate files required for product. Space required for the files will require validation. The system must ensure that the files take up no more than 2 CD's worth of space. In the event that this occurs, an error will be displayed to the user The commerce engine 112 shall support an FTP process for moving uploaded binaries and executables to the POD servers 130 upon activation. The commerce engine 112 shall support physical on demand as a Global Family. (Ex. Download, Physical, Software, Physical on Demand). Versions of theses products will be handled as variations in the commerce engine 112. Fulfillment centers will support all shipping methods. For example, UPS Ground, Federal Express Overnight, Next-day, Second day UPS and DSS will be treated as separate shipping locations for support of their own internal SKU numbers The commerce engine 112 shall support post-CD activation process to alert mail groups of additions/changes to the client DVD insert file. Upon upload and activation of a new or existing product, the commerce engine 112 will email two Outlook defined mail groups (Operations, Print Vendors—TBD). Email contents will contain file attachments (PDF) of new/updated DVD insert received from vendor.

Product setup directory (CD files) should be limited to a size of 690 MB. This does not apply to images for labeling and jacket creation. Those files will be kept in a separate directory. In case of a production failure, the system will be developed to re-queue; (Event will trigger a configurable email notification with information about systems failure).

Product Purchase

At time of purchase for any product requiring CD fulfillment, a fulfillment request 154 will be forwarded to the Associated CD Fulfiller 130 for the site. Ordering a product as Physical on Demand will not allow the client/customer to receive a Backup CD for that same product. Physical on Demand products will be considered Requesting Fulfillment at time of fulfillment request. The Fulfiller 130 will supply a shipment notice. This notice will act as the indicator of fulfillment (triggering any events such as costing/accounting and order notifications).

Product Fulfillment

Physical on Demand machines will require the ability to print CD information in color. POD machines will require the ability to print CD information in black & white. Shipping locale shall generate packing slips in the country's default language only (Net Fulfillment will create packing slips in English only). In the event a Physical on Demand machine goes down, the second Physical on Demand machine will maintain processing of requests. Upon receipt of a Physical on Demand fulfillment request, the machine will extract all files required and burn to a CD. These files include executables and binaries. Case Label generated for Physical on Demand will contain:

Return address;
Mailing address; and
Barcode.
CD Label generated will contain:
Customer Name;
Barcode;
Disc Number (example 1 of X); and
Order Id.

Barcodes contained on the Case Label and the CD Label will be scanned and matched to allow the completion of the pick/pack/ship process. For orders containing two CD's will require the ability to associate each CD barcode with the same label barcode. Countries will be defined in a data repository for fulfillment centers of Physical on Demand products. Based on country definitions and logic, a systematic process should invoke which POD extracts and processes the order. Countries:

North America—Handles all North American POD orders;
Europe—Net Fulfillment handles all European POD orders;
United Kingdom—Handles all other countries; and
APAC—UPS handles all POD orders.

If a country code cannot be determined to process a POD order, Europe will be used at the default.

Once product is shipment ready, the CD Fulfiller will create a shipment notice file. This file will contain order information as well as tracking information confirming orders that have been fulfilled. During the implementation, a time frame for these files will be established. The Physical on Demand delivery will include a CD and Case. Physical on Demand will be processed through typical accounting systems like physical fulfillment of products.

Post Fulfillment Processing

The process manager or owner will receive a shipment notice from each CD Fulfiller. Upon receipt of file, order will be updated with shipment information, and shipment confirmation notification will be forwarded to the Customer with provided tracking information. Costing/Accounting for shipped orders will be processed as they are currently by physical orders. Once the order reaches a state of shipped, costing will be triggered and allow for recognition of revenue. Accounting will be notified (via email) to setup a transaction fee for physical orders based on each POD. Once set up, Accounting personnel charge a standard fee for each unit. Attributes to facilitate Accounting/Costing for Physical on Demand are: SKU#, VERSION ID and PRICE.

Customer Service

A preferred system, namely the Commerce engine 112 will support:

Reships. Will function as a new order; and
A zero price will be charged to the customer; however the system should still charge the POD system. That cost will be transferred back to the vendor.

Digital (software) products cannot be returned physically. Therefore for this project we authorize the use of an electronic letter of destruction (eLOD). There is no impact to Customer Service. Physical on Demand will be integrated just as current physical fulfillment is integrated with Customer Service.

Reporting

The Commerce engine 112 will generate additional reports to capture the following:

Number of Physical on Demand versions live;
Sales by POD region, including (i) Region Codes: (North America, Europe, UK, APAC) and (ii) Filter by POD fulfillment center name; and
Average fee charged for Physical on Demand product.

Accounting reports such as the penetration report will operate as it currently stands. Fulfillment of Physical on Demand will be integrated to act as any physical fulfillment of product is currently reported Notifications Standard Order Confirmation will be utilized for Physical on Demand fulfillment. This fulfillment process will act as any physical fulfillment currently does. Customer will be informed that further notification from E-commerce provider will indicate when fulfillment has been completed.

Production failure event notification will be utilized for Physical on Demand. In the case of a system down or failure, the event will be logged in a database. From this status logged operation, a configurable email will be sent to notify a specified user(s) to take action.

Standard Shipping Confirmation will be utilized for Physical on Demand fulfillment. Upon receipt of shipping notification from the Fulfiller, the e-commerce system will generate this notification to the Customer to indicate fulfillment has been completed and product should be expected shortly.

Page Mock Ups

Figure 5:
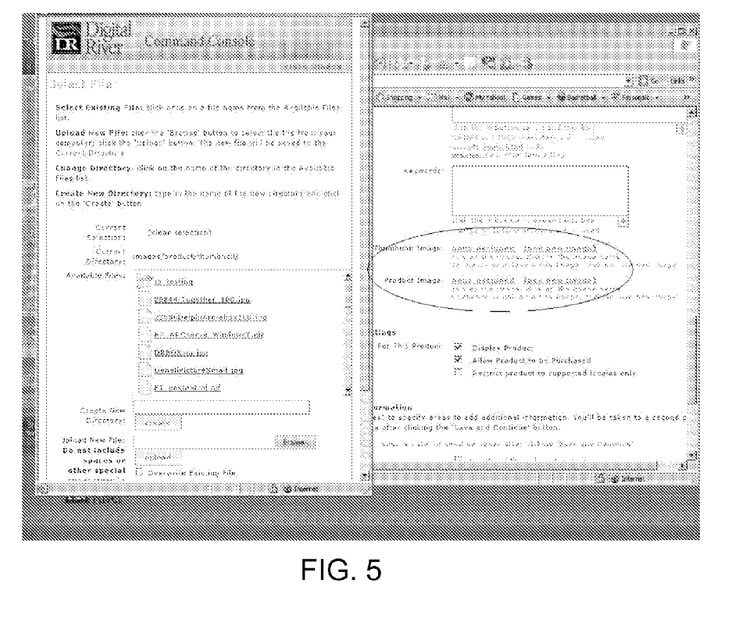

Below is a brief description of the web page flow of user interfaces for this process. The Product Search Page allows a client/administrator to select a product from the Catalog Manager (page not shown). The Product Selection pages shown in FIGS. 5 and 6 allow the client/administrator to select what digital product the Physical On Demand will correspond to. They will also upload the relevant files/file structure that is to be burnt onto the CD. The Upload CD Image Page shown in FIG. 7 allows the client/administrator to upload an image for the top of the CD itself. They will also be able to view what the CD would look like with the image on it. The Upload CD Jacket Page allows the client/administrator to upload images for the front, back and spine of the CD Jacket. They will also be able to preview what the jacket will look like. The print/design specifications for the CD jacket include: label insert measurement, resolution, image format, and bleed zone. More specifically, these specifications are:

Label Insert Measurement: (Bleed Zone) The insert for the DVD case will measure 7¼×10¾ inches. (Live Zone=image size=cut line=7¼"×10¾").
Resolution: For both the CD label and the DVD case the resolution is 300 dpi.
Image Format: The image for both the CD label and DVD case label must be a Microsoft JPEG.
Bleed Zone: Any edge with a full-bleed should extend ¼" beyond the cut line. Consequently since the DVD case label is a 4-edge bleed image, the size would be 7⅝"× 11") text should be no closer than ¼" from the edge of the cut line. Color Range—The printers are CMYK but an "RGB.eps" image is preferred for the DVD cover only.

Use Cases

For the following description, the following definitions will outline each actor in the physical on demand process. A Customer purchases product, which requires CD creation. A Client owns product which has Physical on Demand options available. A Fulfiller fulfills orders for CD portions of Physical on Demand product. The commerce engine 112 hosts and manages sales of Physical on Demand products for Client sites. In the following tables, each major process is outlined.

TABLE 1

Create Physical on Demand Product

| Information | Details |
|---|---|
| Use case name | Same |
| Summary | Client establish a product for purchase on Client site that contains CD fulfillment |
| Primary actor | Client |
| Preconditions | Client site exists. CD Burning facility location has been established for site |
| Minimal guarantees | Any appropriate error messaging is communicated throughout the creation process |
| Success guarantees | Product is added and available for physical on demand |
| Trigger | Client adds product |
| Basic course of events | 1. Client adds product<br>2. System displays product details page<br>3. Client adds product information. Indicates product type as Physical on Demand<br>4. System shows download product file information (i.e. File names, number of files)<br>5. Systems allows client to specify platform type (Ex. Windows, MAC)<br>6. System indicates to establish CD image information<br>7. System indicates to establish Case Jacket information<br>8. Client uploads images and establishes settings for CD and Case Jacket<br>9. System adds files to Physical on Demand FTP Server<br>10. Client completes product set up process and deploys/publishes product<br>11. System adds files to Physical on Demand FTP Server |
| Extensions | |

TABLE 2

Purchase Physical on Demand Product

| Information | Details |
|---|---|
| Use case name | Same |
| Summary | Customer purchases product that contains Physical on Demand fulfillment |
| Primary actor | Customer |
| Preconditions | Product has been created and established with Physical on Demand fulfillment |
| Minimal guarantees | Any appropriate error messaging is communicated during the purchase process |
| Success guarantees | Product is purchased by Client. Fulfillment request is forwarded to appropriate Physical on Demand fulfillment center |
| Trigger | Customer adds product to cart |
| Basic course of events | 1. Customer adds product to cart<br>2. System displays Shopping Cart page with added product<br>3. Customer chooses Physical on Demand option; checks out<br>4. System performs standard check out process. Financial information and screening is successful. Order is created. Product requires physical on demand fulfillment. Fulfillment request is forwarded to predefined site based on ship to location. Thank You page is displayed. Order Confirmation email is forwarded to Customer |
| Extensions | |

TABLE 3

Fulfill Physical on Demand Product

| Information | Details |
|---|---|
| Use case name | Fulfill Physical on Demand Product |
| Summary | Fulfiller receives request for Physical on Demand fulfillment. Order is fulfilled and indicated to E-commerce provider |
| Primary actor | Fulfiller |
| Preconditions | Order has been placed with Physical on Demand product requiring fulfillment |
| Minimal guarantees | |
| Success guarantees | Physical on Demand Product is created and fulfilled |
| Trigger | Physical on Demand request is received |
| Basic course of events | 1. Fulfiller receives fulfillment request. Request is forwarded to Physical on Demand robot for creation<br>2. Robot receives request. Extracts product files and burns CD utilizing predefined settings established for CD information (colour/background image)<br>3. Barcode on CD is scanned<br>4. Colour printer receives request for generation of CD Case Jacket utilizing any configuration established<br>5. CD is placed in CD Case. Case Jacket is inserted to Case. Barcode is scanned on CD. Barcode is scanned on Case. Match is found. Package is shrink wrapped<br>6. Depending on fulfillment center, tracking number is assigned<br>7. Order is shipped to Customer.<br>8. Shipping Notification is forwarded to E-commerce provider |

TABLE 3-continued

Fulfill Physical on Demand Product

| Information | Details |
| --- | --- |
| | 9. E-commerce provider receives shipping notice. Updates order information. Sends Shipping Confirmation email to Customer with appropriate tracking number. Accounting/Costing recognizes revenue |
| Extensions | 2b. Robot is down |
| | 2b1. Robot receives request. System is down. Request is forwarded to secondary Physical on Demand robot. Files are extracted and burned on CD utilizing predefined CD configurations |

TABLE 4

Receive Shipping Notice

| Information | Details |
| --- | --- |
| Use case name | Receive Shipping Notice |
| Summary | E-commerce provider receives shipping notice from Fulfiller that Physical on Demand product has been processed and shipped to Customer |
| Primary actor | E-commerce provider |
| Preconditions | Order has been processed by Fulfiller |
| Minimal guarantees | |
| Success guarantees | Customer is indicated of fulfillment. Order is settled and revenue is recognized |
| Trigger | Shipping Notice is received |
| Basic course of events | 1. Shipping Notice is received from Fulfiller |
| | 2. System updates order information of fulfillment. Forwards shipping confirmation to Customer to indicate fulfillment. Accounting/Costing is performed. Revenue is recognized |
| Extensions | |

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different dialog boxes are presented to a user that are organized or designed differently while maintaining substantially the same functionality without departing from the scope and spirit of the present invention.

What we claim:

1. A method for remote manufacturing of software media from a network, comprising:
providing an interface to a user for selection of a digital file;
receiving an order from a user for purchase of the selected digital file, the order including a file identifier related to the selected digital file and an order identifier related to the order;
verifying the order identifier based upon particular information related to the order, verifying the order identifier including verifying a version of the selected digital file, which includes selecting an active version of the selected digital file at a time of creating the physical-on demand;
selecting a production facility for manufacture based upon particular determined information related to the order by:
determining the production facility geographically close to a delivery location identified by the user;
determining a time to manufacture based upon a current production schedule at the production facility; and
determining the time to deliver from a production facility to a location identified by the user based upon identified shipping constraints; and
processing a delivery of the selected digital file based upon the selected production facility, wherein processing the delivery including:
establishing a physical-on-demand image;
establishing a case image;
adding files to physical-on-demand server; and
completing the product from physical-on-demand server.

2. The method of claim 1 wherein the verifying the order identifier step includes verifying one or more of the following: a file identifier; a version identifier related to the digital file; a uniform resource locator for the file; or a customer identifier associated with the user.

3. The method of claim 1, further comprising providing verification of the order to the user.

4. The method of claim 1, wherein processing the delivery of the file includes receiving a completion file from a production site and sending a match instruction to a warehouse to assemble the physical-on-demand for shipment.

5. The method of claim 1, wherein verifying the order identifier includes sending an error if the order size is greater than two physical-on-demand carriers.

6. The method of claim 1, wherein verifying the order identifier includes blocking a hard copy backup when a physical-on-demand is ordered.

7. The method of claim 1, wherein processing the delivery of the file includes signaling the preparation of a packaging slip in the local language of the shipping locale as determined in the selecting the production facility step.

8. The method of claim 1, wherein processing the delivery of the file includes determining if an order is reship and processing a reship as a new order with a zero balance due.

9. The method of claim 1, wherein processing the delivery of the file includes uploading a physical-on-demand image, a jacket image, and an insert image to associate with the physical-on-demand.

10. The method of claim 1, wherein receiving an order includes receiving platform type.

11. An apparatus for remote manufacturing of software media from a network, the apparatus comprising a server with a processor and a memory and further comprising:
a selection module stored in the memory, the selection module comprising program code which when executed by the processor causes the server to perform operations of providing an interface to the user for selection of a file;

a receive module stored in the memory, the receive module comprising program code which when executed by the processor causes the server to perform operations of receiving an order from a user for purchase of the selected file, the order including a file identifier related to the file and an order identifier related to the order;

an order verifying module stored in the memory, the order verifying module comprising program code which when executed by the processor causes the server to perform operations of
- verifying the order identifier based upon particular information related to the order, and
- verifying a version of the selected file which includes selecting an active version of the selected file at a time of creating the physical-on demand;

a selecting module stored in the memory, the selecting module comprising program code which when executed by the processor causes the server to perform operations of selecting a production facility for manufacture based upon particular determined information related to the order by:
- determining the production facility geographically close to a delivery location identified by the user;
- determining a time to manufacture based upon a current production schedule at the production facility; and
- determining a time to deliver from the production facility to a location identified by the user based upon identified shipping constraints; and a processing module stored in the memory, the processing module comprising program code which when executed by the processor causes the server to perform operations of processing a delivery of the file based upon the module for determining of time to deliver and providing verification of the order to the user, processing the delivery including:
- establishing a physical-on-demand image;
- establishing a case image;
- adding files to physical-on-demand server; and
- completing the product from physical-on-demand server.

12. The apparatus of claim 11 wherein the order verifying module further comprises program code which when executed by the processor causes the server to perform operations of verifying one or more of the following: a file identifier; a version identifier related to the file; a uniform resource locator for the file; or a customer identifier associated with the user.

* * * * *